July 16, 1957  T. M. SHAW ET AL  2,799,823
ANALYTICAL PROCEDURE
Filed June 30, 1950  3 Sheets-Sheet 1

T. M. SHAW & R. H. ELSKEN
INVENTORS

BY ∂. A. [signature]

ATTORNEY

July 16, 1957 T. M. SHAW ET AL 2,799,823
ANALYTICAL PROCEDURE
Filed June 30, 1950 3 Sheets-Sheet 2

T. M. SHAW & R. H. ELSKEN
INVENTORS
BY
ATTORNEY

July 16, 1957     T. M. SHAW ET AL     2,799,823
ANALYTICAL PROCEDURE

Filed June 30, 1950     3 Sheets-Sheet 3

T. M. SHAW & R. H. ELSKEN
INVENTORS

BY *∂.9. Seegrist*

ATTORNEY

United States Patent Office 2,799,823
Patented July 16, 1957

2,799,823
ANALYTICAL PROCEDURE

Thomas M. Shaw, Berkeley, and Richard H. Elsken, Albany, Calif., assignors to the United States of America as represented by the Secretary of Agriculture Application June 30, 1950, Serial No. 171,483

3 Claims. (Cl. 324—.5)

(Granted under Title 35, U. S. Code (1952), sec. 266)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to methods and apparatus for carrying out chemical analyses, particularly by utilizing the nuclear magnetic absorption properties of the material to be analyzed.

It is known in the realm of nuclear physics that many nuclei possess angular momentum, or "spin," and magnetic moment, that is, the nucleus may be envisaged as a spinning top with a magnet embedded along its axis. When such nuclei are subjected to a magnetic field, the spinning nuclei tend to precess around the axis of the magnetic field. The irradiation of such nuclei at a frequency resonant with the frequency of the precessional motion causes changes in the angle of orientation of the nuclei with the magnetic field. Prior investigators have studied these properties of nuclei by subjecting the element to a magnetic field produced by a large permanent magnet and simultaneously irradiating them with radio frequency electromagnetic waves. By varying the frequency of the radio frequency source they have found that the nuclei of most elements will resonate at a particular frequency characteristic of the kind of nucleus. At this resonant frequency, the "spinning" nuclei will absorb a maximum amount of energy. This resonant frequency for any particular nucleus will depend on the value of the magnetic field to which they are subjected. The following table gives, merely by way of example, the resonance frequency and other constants with regard to certain nuclei:

TABLE 1

| Element | Atomic number | Angular momentum [1] (I) | Magnetic moment [2] (u) | Resonance frequency,[3] cyc. per sec. |
|---|---|---|---|---|
| Hydrogen | 1 | 0.5 | 2.7896 | $14.88 \times 10^6$ |
| Carbon | 12 | 0 | 0 | |
| Carbon | 13 | 0.5 | 0.701 | $3.74 \times 10^6$ |
| Nitrogen | 14 | 1 | 0.403 | $2.15 \times 10^6$ |
| Nitrogen | 15 | 0.5 | 0.280 | $1.49 \times 10^6$ |
| Oxygen | 16 | 0 | 0 | |
| Fluorine | 19 | 0.5 | 2.62 | $14 \times 10^6$ |

[1] In units of $h/2\pi$, $h$ being Planck's constant.
[2] In units of nuclear Bohr magnetrons.
[3] For a magnetic field strength of 3500 gauss.

In applying our invention, we utilize the above-outlined properties of nuclei but we utilize them in a manner not heretofore known or described. Thus the principle of our invention involves subjecting a sample of material to an essentially constant magnetic field and simultaneously irradiating the sample with a source of radio frequency electromagnetic waves the frequency of which is essentially in resonance with the oscillation of the nuclei in question, the field produced by the irradiating waves being at right angles to the essentially constant magnetic field. Then we measure the amount of energy absorbed by the system. From this measurement the proportion of the element in question can be determined since the total energy absorbed is a function of the number of nuclei present.

Our invention can be used for the quantitative determination of any element the nuclei of which possess angular momentum and magnetic moment, as for example, hydrogen, helium, lithium, beryllium, boron, nitrogen, and so forth. In addition one can use our invention for quantitative determination of various isotopes of the elements since in many cases the different isotopes have different resonant frequencies. Our invention is not necessarily restricted to analysis for particular elements but is useful also for determining proportions of various compounds. Thus our invention is particularly useful for measurement of moisture content in various materials. In such determination the water content is not determined directly but indirectly by the amount of hydrogen present. It is obvious that by applying the same principles one can use our invention to determine any compound which contains at least one element the nuclei of which possess angular momentum and magnetic moment.

In the accompanying drawings, which are given merely by way of example:

Figure 1:
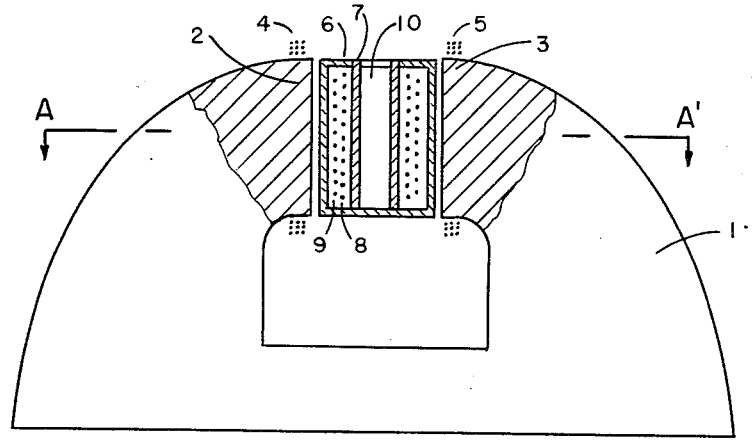
Fig. 1 is a side elevation, partly in cross-section, of our preferred form of apparatus.
Figure 2:
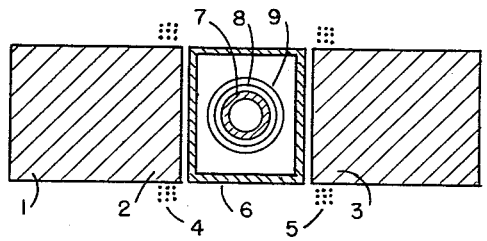
Fig. 2 is a plan view in cross-section taken along plane A—A' of Fig. 1.

The construction of the apparatus of this invention may be explained as follows:

Referring first to Figs. 1 and 2, permanent magnet 1 is provided with poles 2 and 3 about which are placed coils 4 and 5. These coils are wound in the same direction and connected in series so that their fields supplement one another. Between poles 2 and 3 is positioned box 6. On tube 7 are wound coils 8 and 9. The interior 10, of tube 7 provides a chamber for placing the material to be analyzed.

Figure 3:
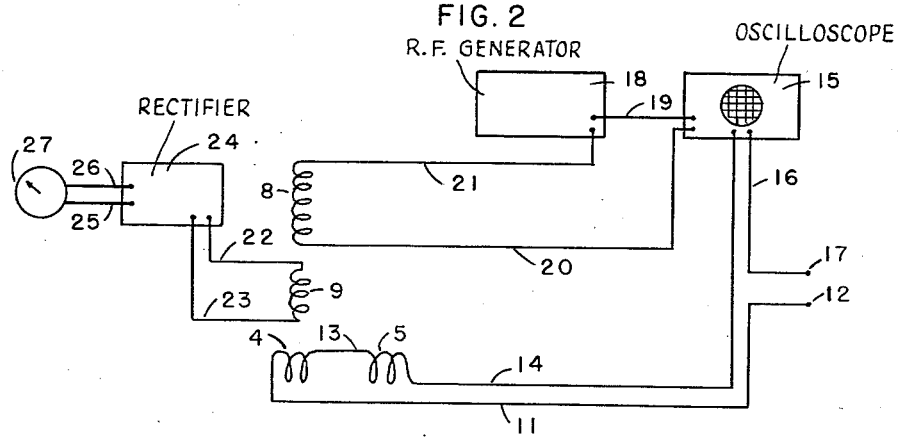
Fig. 3 is a schematic representation of the wiring diagram.

Referring to Fig. 3 which illustrates the wiring arrangement, one end of coil 4 is connected by wire 11 to terminal 12, the other end of coil 4 is connected by wire 13 to one end of coil 5. The other end of coil 5 is connected by wire 14 to oscilloscope 15 which in turn is connected to terminal 17 by wire 16. Terminals 12 and 17 are adapted to be connected to a suitable source of alternating current at a frequency of, for example, about 60 cycles/sec. Using this wiring arrangement, the current supplied to terminals 12 and 17 flows through oscilloscope 15 and into coils 4 and 5 where it causes a variation of the magnetic field produced by magnets 1 as hereinafter explained. The current flowing through oscilloscope 15 is used as the horizontal scanning current also as explained below. Radio frequency generator 18 is connected to oscilloscope 15 and coil 8 via wires 19, 20, and 21. Thus the current supplied by this generator passes through oscilloscope 15 whereby the energy supplied to coil 8 may be measured. Coil 9 is connected by wires 22 and 23 to rectifier 24 which in turn is connected by wires 25 and 26 to galvanometer 27.

Figure 4:
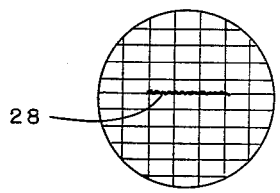
Figs. 4 and 5 are enlarged views of the oscilloscope screen illustrating the type of traces obtained.
Figure 5:
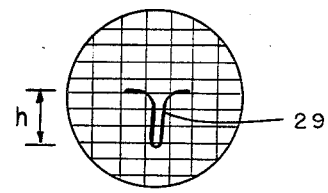

Referring to Figs. 4 and 5 which are enlarged views of the oscilloscope screen, line 28 (Fig. 4) represents the oscilloscope trace obtained before the sample is placed in chamber 10. Curve 29 (Fig. 5) represents the peak trace obtained when the sample is placed in chamber 10. The height of peak 29, $h$, is a measure of the energy absorbed by the sample under test.

Figure 6:
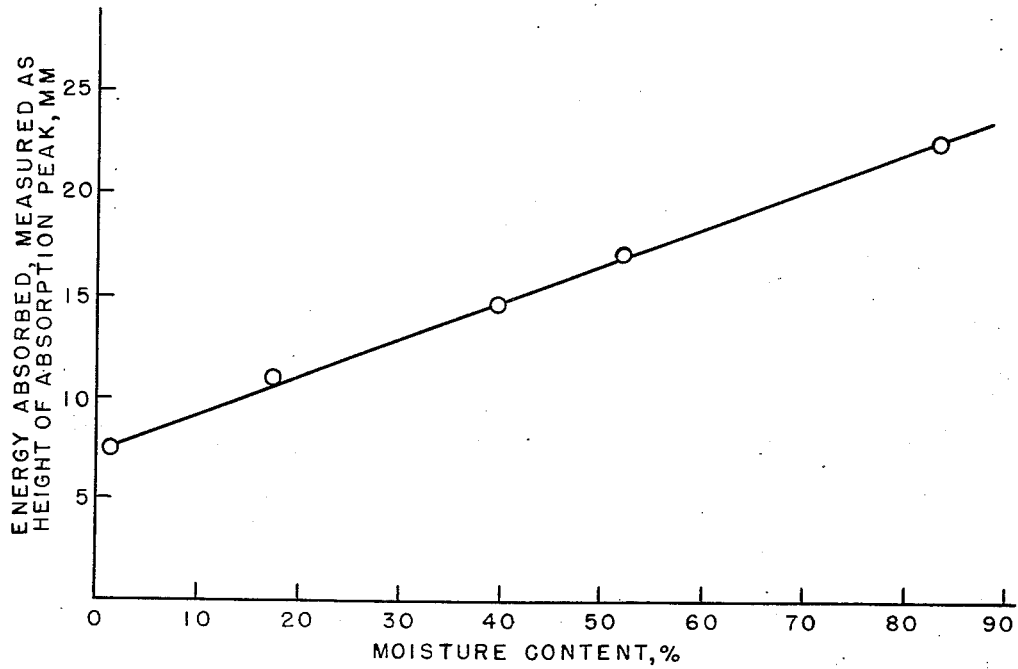
Fig. 6 is a graph illustrating the relationship between the readings obtained on the apparatus versus moisture content of the samples being tested.

Referring to Fig. 6, this graph gives the relationship between the energy absorbed as measured by the height of the peak on the oscilloscope screen versus moisture content for samples of apple tissue. Further details with regard to this graph are set forth in the example herein.

The functions of the apparatus may be explained as follows:

Permanent magnet 1 provides a high-intensity, constant electromotive field between the faces of poles 2 and 3. Although a permanent magnet is preferred one can use instead an electromagnet energized by a suitable source of direct current. In any case the magnet chosen must supply as strong a magnetic field as possible since, other conditions being equal, a stronger magnet will produce a larger and hence more easily measurable absorption of energy. Further, the stronger the magnet, the larger may be the space between the poles whereby larger samples may be subjected to the analysis.

Box 6 is made of a non-magnetic metal such as copper, brass, aluminum, silver, or the like. The function of box 6 is essentially to act as a shield to prevent the field of coils 4 and 5 from affecting the field of coil 8.

Tube 7 is preferably made of glass or other dielectric material which does not contain the element being analyzed for. Its walls should be thin to allow use of as large a sample as possible. If tube 7 is constructed of a material which contains the element being analyzed for then suitable correction for its content of this element must be made. Thus if tube 7 contains hydrogen in chemical or physical combination and hydrogen is being determined, then in calculating the final result one must take into account the amount of hydrogen present in tube 7.

Coil 8 is a simple solenoid which irradiates the sample under test with the high frequency electromagnetic waves. Since it is desirable to provide a homogeneous field, we prefer to wind this coil in such fashion that relatively more turns are present on the top and the bottom than in the middle whereby a nearly homogeneous field is produced. Other wiring arrangements as well known in the art to produce a homogeneous field may be used in fabricating coil 8.

Coil 9, and associated rectifier 24 and galvanometer 27 are provided simply to measure the gross input of energy into coil 8. Thus when the device is being operated the field produced by coil 8 will induce a current in coil 9. This current is rectified by rectifier 24 and the rectified current measured by galvanometer 27. Thus in day to day operation of the device, the gross input of energy to coil 8 can be determined and suitable adjustments of generator 18 can be made to keep this energy level constant. Coil 9 and asociated mechanisms 27 and 29 are not sensitive enough to measure the drop in energy when a material is under test but merely measure the gross input to the system.

Radio frequency generator 18 supplies energy to coil 8 to irradiate the sample in chamber 10 with the high frequency electromagnetic waves essentially in resonance with the oscillations of the nuclei in question. It is noted that the field produced by coil 8 is at right angles to the field produced by magnet 1. Thus the field of coil 8 is vertical and that produced by magnet 1 is horizontal. It is obvious that the same relationship can be obtained by rotating coil 8 to any other position wherein its field remains at right angles to the field produced by magnet 1. Thus, for example, coil 8 may be turned on its side to create a field at right angles to the paper on which Fig. 1 is drawn. The frequency to be supplied to coil 8 depends on the strength of the magnetic field produced by magnet 1 and by the properties of the nuclei of the element in question. In any case the proper frequency can be determined by the equation:

$$f = \frac{ueH \times 10^{-4}}{4\pi MI}$$

wherein:

$f$ = frequency in cycles/sec.
$u$ = magnetic moment of the nucleus in question
$e$ = charge of an electron ($1.602 \times 10^{-19}$ coulomb)
$H$ = magnetic field in gauss
$M$ = mass of hydrogen nucleus, i. e., a proton ($1.6725 \times 10^{-27}$ kilogram)
$I$ = angular momentum of the nucleus.

The constants $u$ and $I$ for various nuclei are given by way of example in Table 1.

Coils 4 and 5 are provided mainly because it is virtually impossible to keep the frequency of the current supplied to coil 8 at the exact resonance frequency. If one could obtain a generator which could supply an absolutely steady resonance frequency, then coils 4 and 5 could be omitted. In such case it would only be necessary to note the amount of energy supplied to coil 8 when chamber 10 was empty, then insert the sample in chamber 8 and measure the energy then supplied to the system by noting the height of the peak registered on oscilloscope 15. In such case oscilloscope 15 would be operated in conventional fashion by energizing the horizontal sweep with a saw-tooth wave and energizing the vertical sweep with the current being supplied to coil 8. In actual operation however it has been found that such operation cannot be relied on. Slight variations in the frequency of the current supplied to coil 8 cause the oscilloscope pattern to jiggle about on the screen as the frequency rises above and falls below the resonance value. In order to eliminate this problem then, coils 4 and 5 are provided and energized with a source of low frequency current such as 60 cycle/sec. alternating current. Further, this current is also applied to oscilloscope 15 and utilized to energize the horizontal sweep of the cathode ray. The current supplied to coil 8 is again used to energize the vertical sweep. Coils 4 and 5 have the effect of slightly and periodically raising and lowering the magnetic field between poles 1 and 2. Thus at one instant this field is slightly increased and at the next instant it is slightly decreased, the total change in field strength being in the order of $\pm 0.1\%$. Since magnetic field strength and resonance frequency are inter-related this means that the system is being subjected to varying conditions in which proper resonance levels are being reached at repeating intervals as the field strength rises and falls. Further by applying both the 60-cycle alternating current and the high frequency current to oscilloscope 15 these pulsations are synchronized and the resulting trace obtained on the oscilloscope represents energy level in the vertical direction and magnetic field strength in the horizontal direction. Under such conditions the trace no longer jiggles on the screen but remains steady since energy level and magnetic field strength are synchronized. It is evident that many alternative conditions may be employed for slightly varying the magnetic field. For example, although we prefer to energize coils 4 and 5 with 60-cycle current, one may use a wide range of frequency for this purpose, i. e., from about 25 to about 500 cycles per second. Further, it is to be noted that the net change of magnetic field strength need only be small, on the order of ±0.1% or less depending on the type of radio frequency generator used. Obviously, the less variation in radio frequency, the less change in magnetic field strength will be required. Since the net change is of a low order of magnitude, the magnetic field may actually be considered as constant for the purposes of the calculations and determinations.

Oscilloscope 15, as above explained, is used for measuring the energy absorbed when the sample of material is placed in chamber 10. Although an oscilloscope is preferred for measuring the energy absorbed, one may also use other devices suitable for such purposes as a sensitive vacuum tube voltmeter or synchronous rectifier coupled with an amplifier and a micro-ammeter.

In carrying out determinations in accordance with this invention many alternative procedures may be followed. One method as used in connection with determination of moisture in biological tissue is explained as follows. It is understood that similar techniques can be applied to determine the proportion of any element or compound in any type of material.

Several samples of the biological tissue are obtained, all the samples being of the same size and adapted to fit in chamber 10. It is usually desirable to make the samples somewhat longer than chamber 10 so that the samples may be readily deposited in and withdrawn from chamber 10. These samples are then dried to various moisture levels and the moisture content of each sample determined by suitable means as for example by loss in weight on heating to moderate temperatures, i. e., up to about 100° C. The samples are then consecutively placed in the apparatus and amount of energy absorbed in each case is measured usually for simplicity by measuring the height of the absorption peak on the oscilloscope. These results then are usually plotted on graph paper to give a line representing the amount of energy absorbed versus moisture content. Such a graph can then be used to determine moisture contents in samples of the same biological tissue containing unknown proportions of moisture.

Another method of using the apparatus is to calibrate the screen on the oscilloscope to give directly the moisture content of the sample under test. If such a technique is used a number of different screens can be prepared for different types of material. Thus one screen may be calibrated for apple tissue, another for peach tissue and so on. In using such screens as in all cases the test samples must have the same volume as the samples used in preparing the calibration or a proper correction made for difference in volume.

A further method of using the apparatus involves making it absolute and independent of the size of the sample. This technique may best be explained by reference to a particular example, it being understood that reference to specific materials is only given by way of illustration. Thus the apparatus may be used for making absolute moisture measurements on a cellulosic material, cotton for example. In doing this, the apparatus is first used to (a) make measurements on samples of pure cellulose, using a resonant frequency corresponding to $C^{13}$ which isotope exists in all carbonaceous materials in a definite ratio relative to the total amount of carbon. From these determinations, the height of the absorption peak can be correlated with definite amounts of carbon. (b) Measurements are then made with the apparatus on samples of pure water using a resonant frequency corresponding to hydrogen. From these measurements, the height of the absorption peak can be correlated with definite amounts of hydrogen. (c) The apparatus is then applied to a sample of cotton containing an unknown amount of water and measurements are made with regard to $C^{13}$ and hydrogen using the resonant frequencies corresponding to these nuclei. By applying the data obtained in part (a), the absorption reading for $C^{13}$ can be used to calculate the amount of cellulose present. From these data, the amount of hydrogen chemically combined in the cellulose can be calculated by stoichiometry. By subtracting this amount of bound hydrogen from the total amount of hydrogen found in the sample, one can then find the amount of hydrogen present as water. From these data it is then simple to determine by stoichiometry the amount of water. Further in this method the important factor is the ratio of carbon to hydrogen not the actual amounts of each so that the weight or volume of sample need not be determined, where the data sought is the ratio of moisture to total weight or weight of solid material.

Figure 7:
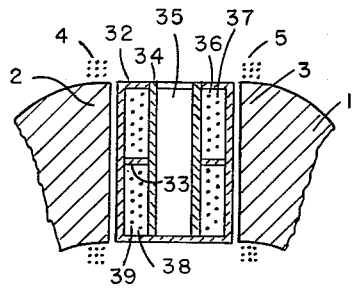
Fig. 7 is a side elevation in cross-section of an alternative form of apparatus.

In Fig. 7 is shown an alternative arrangement suitable for making simultaneous measurements with regard to two different nuclei. In this arrangement, magnet 1 and coils 4 and 5 are as previously described. Box 32 which corresponds to box 6 in the modification of Figs. 1 and 2, is made of a non-magnetic metal and is provided with wall 33 also made of non-magnetic metal to divide it into two compartments. Tube 34 made of a dielectric material is used as a support for the coils, the interior of the tube, 35, serving as a chamber to receive the sample under test. On the upper half of tube 35 are wound coils 36 and 37, on the lower half of the tube are wound coils 38 and 39.

Figure 8:
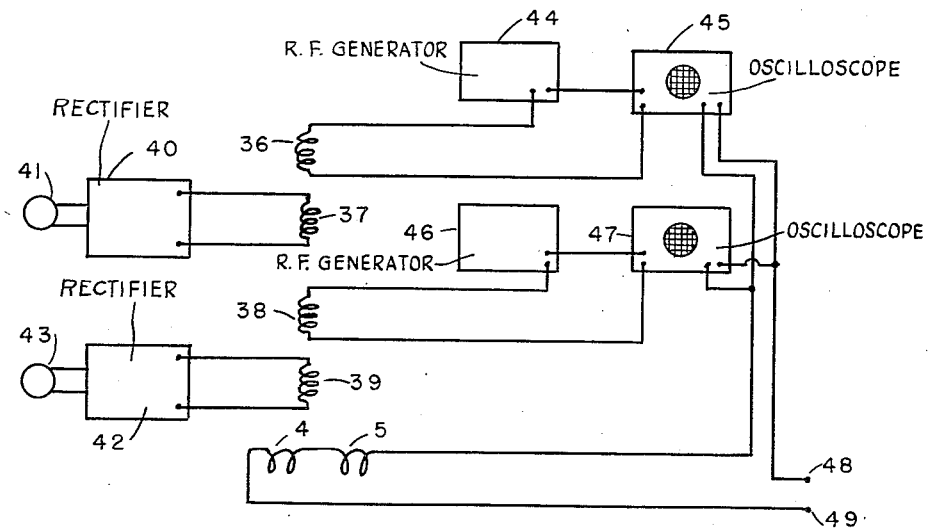
Fig. 8 is a schematic representation of the wiring diagram of the alternative form of apparatus shown in Fig. 7.

Referring to Fig. 8 which illustrates the wiring arrangement, coil 37 is connected to rectifier 40 and galvanometer 41 whereas coil 39 is connected to rectifier 42 and galvanometer 43. Thus coils 37 and 39 and associated mechanisms serve to measure the gross input of energy into each half of the system as explained above in connection with coil 9 in Figs. 1, 2, and 3. Radio frequency generator 44 supplies energy to coil 36 which energy is measured by oscilloscope 45. Radio frequency generator 46 supplies energy to coil 38 which energy is measured by oscilloscope 47. The alternating current applied to terminals 48 and 49 energizes coils 4 and 5 and this current is also applied to oscilloscopes 45 and 47 for reasons explained above.

In using this modification, coil 36 is energized with a current the frequency of which is in resonance with one particular nucleus, for example, $C^{13}$. Coil 38 is energized with a current the frequency of which is in resonance with another nucleus, for example, hydrogen. By noting the loss of energy in the separate circuits, simultaneous measurement with regard to two separate elements may be made.

Figure 9:
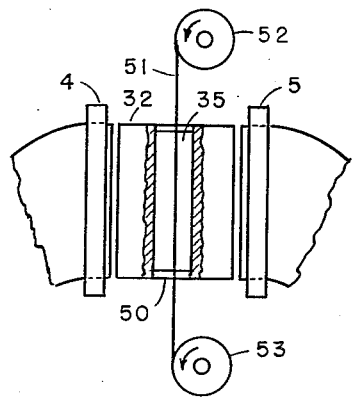
Fig. 9 is a side elevation, partly in cross-section, of an alternative form of apparatus suitable for continuous measurement on filamentary material.

In Fig. 9 is shown a modification of our apparatus suitable for continuous measurements on filamentary material such as cotton, wool, silk, rayon, and so forth. In this device the bottom of box 33 is provided with a port 50 so that chamber 35 is open at both ends. The filamentary material 51 wound on spool 52 is transported through chamber 35 by rotating spool 53 on which the material is finally wound. As depicted in Fig. 9, this arrangement is particularly adapted to be used in connection with the dual measuring equipment as shown in Fig. 8. By using this arrangement one can continuously determine the moisture content or other analytical data on the filament. This modification is thus valuable in the production of various types of fibers where it is desirable to keep a constant check on the moisture content or other chemical characteristics of the fiber as it is being produced. It is also obvious that the modification depicted in Figs. 1, 2, and 3 can likewise be equipped with suitable spools for continuous measurement on filamentary material.

The following example is given merely by way of illustration to show how the invention may be carried out in practice.

*Example—Measurement of moisture in apple tissue*

A series of determinations were made on sections of apple tissue using the apparatus as described above in Figs. 1, 2, and 3. The magnetic field strength between poles 2 and 3 was 3500 gauss; the frequency of current supplied to coil 8 was 14.7 megacycles/sec.; coil 8 was a solenoid 5 mm. internal diameter by 35 mm. long. Observations were made at room temperature (about 25° C.).

An apple was sectioned into cylindrical pieces 3 mm. in diameter and 50 mm. long. These pieces were then partially dehydrated to various moisture levels and the moisture content of each piece determined by customary analytical techniques—i. e., subjecting to moderate heat and determining the loss of weight.

In starting the series of tests, the various currents were turned on and the conditions adjusted so that oscilloscope showed a horizontal line trace. Then a section of apple tissue was inserted in chamber 10. The absorption of energy by the hydrogen nuclei caused the formation of an inverted peak trace on oscilloscope 15. The height of the peak was measured by means of the screen covering the cathode ray tube. The apple tissue was then removed from chamber 10. This process of determining the energy absorbed was repeated on all the remaining samples. The results obtained are set forth in the following table:

| Energy absorbed, as measured by height of absorption curve, mm. | Moisture contents, percent |
| --- | --- |
| 22.5 | 84.2 |
| 17.0 | 52.5 |
| 14.5 | 37.3 |
| 11.0 | 18.2 |
| 7.5 | 1.7 |

The above figures demonstrate that the amount of energy absorbed is directly proportional to the moisture content. These data can be used for rapid determination of moisture in apple tissue samples of unknown moisture content. Thus, for example, if the sample of unknown moisture content having the same dimensions as previously mentioned is placed in the device and exhibits an energy absorption of 15 mm. the moisture content is 42.5%. For convenience, one may plot on graph paper the energy absorption measured in terms of the height of the peak versus percent moisture content of the apple tissue using the data set forth in Table 2. The graph as prepared is shown in Fig. 6. Using this graph one can read directly the moisture content corresponding to the height of the peak obtained with an unknown sample. It is obvious of course that the unknown sample must have the same volume as the samples used in preparing the calibration. If the unknown sample is of different volume then suitable correction must be made. For example, if the unknown sample is half the volume of the samples used in preparing the calibration then the reading of the height of the peak obtained with the unknown must be multiplied by two to obtain the corrected reading.

Having thus defined our invention, we claim:

1. An analytical process which comprises establishing a zone which is subjected to an essentially constant magnetic field and which is irradiated with electromagnetic waves at a frequency essentially in resonance with the nuclei of the element being determined, the field produced by the irradiating waves being at right angles to said essentially constant magnetic field, measuring the energy supplied to said zone by the irradiating waves under such conditions, introducing a sample of the material to be analyzed into said zone whereby the sample absorbs an amount of energy proportional to the amount of the element present in the sample, measuring the energy supplied to the zone by the irradiating waves under such conditions, the difference between the energy supplied when the sample is in the zone and when the sample is not in the zone being proportional to the amount of the element in the sample, and from this measurement calculating the amount of said element in the sample.

2. A method for determining moisture content which comprises establishing a zone which is subjected to an essentially constant magnetic field and which is irradiated with electromagnetic waves at a frequency essentially in resonance with the hydrogen nuclei in the sample, the field produced by the irradiating waves being at right angles to said essentially constant magnetic field, measuring the energy supplied to said zone by the irradiating waves under such conditions, introducing a sample of the material whose moisture content is to be determined into said zone whereby the sample absorbs an amount of energy proportional to the amount of hydrogen in the sample, measuring the energy supplied to the zone by the irradiating waves under such conditions, the difference between the energy supplied when the sample is in the zone and when the sample is not in the zone being proportional to the amount of hydrogen in the sample, and from this measurement calculating the amount of water in the sample.

3. An analytical device comprising a magnet, a winding about each pole of the magnet, means for exciting said windings from a source of alternating current whereby to cause slight, periodic variations in the magnet field strength, a metal container positioned between the poles of said magnet, a metal separator for dividing said container into two compartments, a coil in each of said compartments, means for exciting said coils with high frequency electromagnetic waves, the fields produced by each of said coils being at right angles to the field of said magnet, a chamber positioned within said coil adapted to hold a sample of material to be analyzed, at least one end of said chamber being open and readily accessible to facilitate insertion and removal of the sample and means connected with said coils for measuring the energy absorbed by a sample of material when the coils are excited with said high frequency electromagnetic waves.

References Cited in the file of this patent

UNITED STATES PATENTS

| | | |
| --- | --- | --- |
| 2,485,579 | Elliott | Oct. 25, 1949 |
| 2,561,489 | Bloch et al. | July 24, 1951 |
| 2,561,490 | Varian | July 24, 1951 |
| 2,589,494 | Hershberger | Mar. 18, 1952 |

OTHER REFERENCES

Physical Review, vol. 70. Nos. 7 and 8, Oct. 1 and 15, 1946, pages 460–473, article by Bloch, titled Nuclear Induction.

Physical Review, vol. 70, Nos. 7 and 8, Oct. 1 and 15, 1946, pages 474–484, article by Bloch et al., titled The Nuclear Induction Experiment.

The Review of Scientific Instruments, vol. 20, No. 7, July 1949, pages 516–517, article by Thomas.